Dec. 7, 1954  D. S. WILLARD  2,696,582

PHASE SENSITIVE RECTIFIER

Filed May 7, 1953

*INVENTOR.*
DAVID S. WILLARD
BY
*William R Lane*
ATTORNEY

United States Patent Office 2,696,582
Patented Dec. 7, 1954

2,696,582

PHASE SENSITIVE RECTIFIER

David S. Willard, Gardena, Calif., assignor to
North American Aviation, Inc.

Application May 7, 1953, Serial No. 353,655

5 Claims. (Cl. 321—8)

This invention relates to phase sensitive rectifiers, and more particularly to phase sensitive rectifier circuits which pass current through a load only when the voltage which is rectified has a predetermined phase relation to a reference voltage.

It is sometimes necessary to rectify a modulated alternating current voltage to cause a current flow proportional to the amplitude of the applied voltage and in a direction which depends upon the phase relation of the alternating voltage to a reference voltage of the same frequency. This invention contemplates a relatively simple circuit which selectively gates a rectifier according to the phase relation between the alternating component of the applied voltage and a reference voltage of the same frequency to cause current to flow in a load resistor in one direction when the alternating component of the applied voltage is in phase with the reference voltage and to cause current to flow in the other direction through the load when the alternating component of the applied voltage is 180° out of phase with the reference voltage. Circuits which perform this function are usually complex and have a large number of parts, and unbalanced components in the reference signal circuit path affect the amplitude of the output signal to thereby produce an output current when there is no input voltage. The circuit contemplated by this invention is relatively simple and has few parts except for the coupling resistor. Unbalanced components in the reference signal circuit path do not affect the amplitude of the output current or produce output current when there is no input voltage. In addition, variations in amplitude of the reference voltage of this invention do not affect the amplitude of the output current unless the reference voltage is reduced to a value which is insufficient to gate the rectifier.

Phase sensitive rectifiers or demodulators, such as the device contemplated by this invention, are used, for example, with a sensing device to measure displacement, strain, or acceleration. The output voltage from the sensing device is customarily either in phase with or opposite in phase to a reference voltage. The phase of the voltage generated by the sensing device relative to a reference voltage depends upon the direction of the displacement, strain, or acceleration. The amplitude of the voltage from the sensing device is customarily proportional to the magnitude of the displacement, strain, or acceleration. Hence, the phase sensitive rectifier or demodulator must produce a current which is proportional to the magnitude of the voltage from the sensing instrument, and which has a direction that depends upon the phase relation between the voltage from the sensing instrument and a reference voltage.

It is therefore an object of this invention to provide an improved phase sensitive rectifier.

It is another object of this invention to provide an improved phase sensitive demodulator.

It is another object of this invention to provide means for creating a current whose amplitude is proportional to the amplitude of an alternating current voltage and whose polarity depends upon the phase relation of said alternating current voltage with respect to a reference voltage.

It is another object of this invention to provide phase sensitive rectifier means in which the output voltage is zero when the input voltage is zero.

It is another object of this invention to provide phase sensitive rectifier means in which reasonable unbalance of components in the reference signal circuit path does not affect the output voltage.

It is another object of this invention to provide phase sensitive rectifier means in which reasonable changes in the amplitude of the reference voltage do not affect the amplitude of the output voltage.

It is another object of this invention to provide phase sensitive rectifier means in which the direct current amplitude of the output voltage is proportional to the amplitude of the alternating current input voltage and in which said output voltage has a polarity which is dependent upon the phase relation between said alternating current input voltage and a reference voltage of the same frequency.

It is another object of this invention to provide phase sensitive rectifier means which has very small power requirements.

Other objects of invention will become apparent from the following description taken in connection with the accompanying drawings, in which Fig. 1 is a basic circuit;

Rectifiers are two terminal networks which for an applied alternating voltage of a given amplitude, conduct more current in one direction than in the other direction. The direction of current flow is defined herein as the direction of electron flow. The direction in which the larger amount of current flows for a given applied voltage is customarily called the forward direction of the rectifier. The direction in which the smaller amount of current flows is customarily called the backward direction of the rectifier. Each rectifier comprises two major elements or electrodes defined, by analogy to vacuum tube rectifiers, herein as an anode and a cathode. When the current or electron flow is in the forward direction of the rectifier, the voltage upon the anode is positive with respect to the cathode and the current or electron flow inside of the rectifier is from the cathode to the anode. It is evident that this is true regardless of the type of rectifier, such as a vacuum tube rectifier, a gas tube rectifier, a germanium rectifier, a mercury pool rectifier, a selenium rectifier, or a copper oxide rectifier.

In each of the following described circuits voltage sources 1 and 6 may alternatively be connected into the circuit by means other than transformer coupling such as, for example, resistance-capacitance coupling, or inductance-capacitance coupling. Where a multiple winding transformer is shown, a plurality of transformers may be substituted. These substitutions are known and are intended to be covered by this patent in combination with the additional novel circuitry shown and described below.

Figure 1:
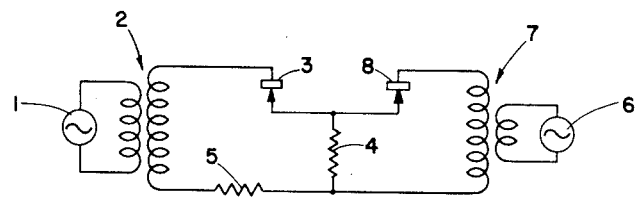

Referring to Fig. 1, the circuit is logically divided into two uni-directional current paths. The first uni-directional current path comprises input voltage source 1, transformer 2, rectifier 3, coupling resistor 4, and resistor 5. The second uni-directional current path comprises reference voltage source 6, transformer 7, rectifier 8, and resistor 4. The only common elements between the two current paths is coupling resistor 4. Voltage source 1 is connected across the primary of transformer 2. The secondary of transformer 2 is connected across rectifier 3, resistor 4, and resistor 5 in series. Reference voltage source 6 is connected across the primary of transformer 7. The secondary of transformer 7 is connected across rectifier 8 and resistor 4 in series. Rectifiers 3 and 8 have their cathodes connected together. Voltage source 6 must apply a voltage across rectifier 8 which is sufficiently high to cause the current flow in impedance 4 to gate rectifier 3.

Figure 2:
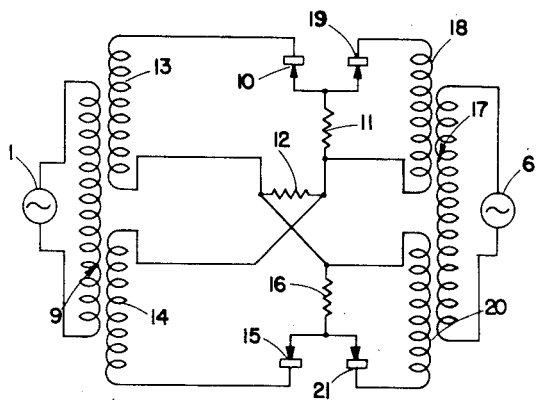
Fig. 2 is a circuit diagram of a means for connecting two basic circuits together through a resistor load.

In Fig. 2, voltage source 1, winding 13 of transformer 9, rectifier 10, resistor 11, resistor 12, voltage source 6, winding 18 of transformer 17, and rectifier 19 forms an identical circuit to that shown in Fig. 1. Voltage source 1, winding 14 of transformer 9, rectifier 15, resistor 16, resistor 12, winding 20 of transformer 17, together with voltage source 6, and rectifier 21 comprises an identical circuit to that shown in Fig. 1. The two circuits shown in Fig. 2 have a common resistor 12 which is the load resistor. Either the voltage across the secondary of winding 14 is 180° out of phase with the voltage across the secondary winding 13, while the voltage across secondary winding 18 is in phase with the voltage across secondary winding 20, or the voltage across secondary winding 18 is 180° out of phase with the voltage across secondary winding 20, while the voltage across secondary winding 13 is in phase with the voltage across secondary winding 14. One circuit of Fig. 2 tends to make current flow through resistor 12 in one direction when that particular circuit is conducting current, while the second circuit tends to make current flow in the other direction through resistor 12 when the second circuit is conducting.

Figure 3:
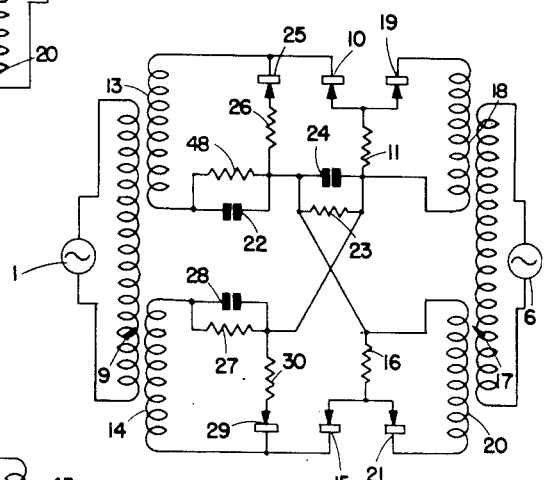
Fig. 3 is a circuit diagram which shows a means for connecting two circuits of this invention together through a capacitance filtered load.

The circuit in Fig. 3 is similar to the circuit in Fig. 2 except that condenser 24 has been connected in parallel with load resistor 23; the parallel combination of resistor 48 and condenser 22 is connected in series between winding 13 and load resistor 23; the series circuit of rectifier 25 and resistor 26 is connected between the junction of resistors 16, 48, and 23 and to the anode of rectifier 10; the parallel circuit of resistor 27 and condenser 28 is connected in series between winding 14 and resistor 23; the series circuit of resistor 30 and rectifier 29 is connected between the junction of resistors 11, 27, and 23 and the anode of rectifier 15; the anodes of rectifiers 10 and 25 are connected together; and the anodes of rectifiers 15 and 29 are connected together.

Figure 4:
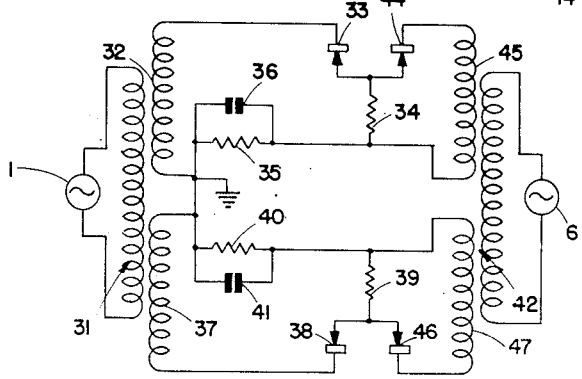
Fig. 4 is a circuit diagram of two basic circuits which have a common terminal.

In Fig. 4, voltage source 1, winding 32 of transformer 31, rectifier 33, resistor 34, resistor 35, winding 45 of transformer 42, voltage source 6 and rectifier 44 comprise a circuit which is identical to the circuit of Fig. 1. In addition, condenser 36 is connected in parallel to resistor 35 to provide a smooth output. Similarly, voltage source 1, winding 37 of transformer 31, resistor 40, resistor 39, rectifier 38, voltage source 6, winding 47 of transformer 42, and rectifier 46 form an identical circuit to that shown in Fig. 1. Condenser 41 is connected in parallel to resistor 40 to provide a smooth output. Windings 32 and 37 are connected together and grounded to provide a reference point from which voltages can be measured. The connection between windings 32 and 37 is such that their common terminal forms a center tap of the secondary winding of transformer 31.

In each of the Figures 1 through 4, the rectifiers are shown connected with a certain polarity. This invention further embodies the structure wherein each and every one of the rectifiers in a particular circuit has its polarity reversed. Thus, in Fig. 1, the anodes would be connected together, while the cathodes would be connected to transformers 2 and 7, respectively. In Fig. 2, the anodes of rectifiers 10 and 19 would be connected together to resistor 11 while the cathodes would be connected to windings 13 and 18. Similarly, the anodes of rectifiers 15 and 21 would be connected together to resistor 16 while the cathodes would be connected to windings 14 and 20. In Fig. 3, the cathodes of rectifiers 10 and 25 would be connected together, while the anodes of rectifiers 10 and 19 would be connected together. Similarly, the cathodes of rectifiers 15 and 29 would be connected together, while the anodes of rectifiers 15 and 21 would be connected together. The cathodes of rectifiers 10 and 19 would be connected to windings 13 and 18, respectively, while the cathodes of rectifiers 15 and 21 would be connected to windings 14 and 20, respectively. In Fig. 4, the anodes of rectifiers 33 and 44 would be connected together to resistor 34 while the cathodes would be connected to windings 32 and 45. Similarly, the anodes of rectifiers 38 and 46 would be connected together to resistor 39 while the cathodes would be connected to windings 37 and 47.

In operation, when the voltage across the secondary of transformer 2, in Fig. 1, is in phase with the voltage across the secondary of transformer 7, rectifier 8 conducts current through resistor 4 which biases the cathode of rectifier 3 so that the voltage between the cathode and anode of rectifier 3 is insufficient to cause rectifier 3 to conduct current. Hence, no current flows through resistor 5. When the voltage across the secondary of transformer 2 is 180° out of phase with the voltage across the secondary of transformer 7, rectifier 8 does not conduct at the same time rectifier 3 tends to conduct. Therefore, the entire voltage of the secondary of winding 2 appears across rectifier 3, and rectifier 3 conducts current through resistors 4 and 5.

In Fig. 2, each of the two circuits shown, which are identical to the circuit of Fig. 1, conduct at a different time. Because either the voltage from winding 13 is 180° out of phase with the voltage from winding 14, while the voltage from winding 18 is in phase with the voltage from winding 20; or the voltage from winding 18 is 180° out of phase with the voltage from winding 20, while the voltage from winding 13 is in phase with the voltage from winding 14. Hence, rectifier 10 cannot conduct while rectifier 15 is conducting, and rectifier 15 cannot conduct while rectifier 10 is conducting. When rectifier 10 conducts, current flows through resistor 12 in one direction. When rectifier 15 conducts, current flows through resistor 12 in the other direction, because of the cross connection shown in Fig. 2. Thus, when the voltage of voltage source 1 is in phase with the voltage of voltage source 6, current flows in one direction through resistor 12, while when the voltage of voltage source 1 is 180° out of phase with the voltage of voltage source 6, current flows in the other direction through resistor 12.

In Fig. 3, condenser 24 stores a charge which causes a voltage which is of direct current character to appear across resistor 23. This direct current voltage tends to interfere with the proper operation of rectifiers 10 and 15 so that they do not respond as described for Fig. 2. Rectifier 25, resistors 48 and 26, and condenser 22 are provided in one circuit while rectifier 29, resistors 27 and 30, and condenser 28 are provided in the other circuit to counteract the undesirable interference of the voltage upon condenser 24 with the operation of rectifiers 10 and 15. The operation of only one of these circuits need be described. Rectifier 25 conducts current for every positive half cycle of the voltage upon winding 13 regardless of whether rectifier 10 conducts current. When rectifier 10 does not conduct current, rectifier 15 does conduct current. When rectifier 15 conducts current, a voltage is stored upon condenser 24 which is of a polarity such that the positive terminal of condenser 24 is connected to condenser 22 while the negative terminal is connected to resistor 11. Because rectifier 25 conducts current even when rectifier 10 does not conduct current, condenser 22 is charged to a voltage which has a magnitude and polarity that opposes the voltage upon condenser 24 so that the voltage upon condenser 24 does not cause rectifier 10 to conduct. When rectifier 10 conducts, rectifier 25 serves to shunt some of the current flow around rectifier 10 to cause a voltage drop across resistor 48 which counters the nonlinearity of rectifier 10 so that the voltage across rectifier 10 is not linearly related to the voltage across winding 13 but the current flowing through rectifier 10 is linearly related to the voltage across winding 13, and hence, the voltage across resistor 23 is linearly related to the voltage across winding 13. Although the voltage across resistor 23 is not an alternating voltage because of the presence of condenser 24, the magnitude of the voltage across resistor 23 is linearly proportional to the peak amplitude of the alternating voltage across winding 13.

Each circuit in Fig. 4 operates independently of the other circuit. There is no common load resistor between the two circuits and hence, no cross coupling of the type considered in connection with Fig. 3. Conduction of rectifier 38 creates a voltage across resistor 40 but does not create a voltage across resistor 35. No auxiliary circuit is necessary for the proper operation of the circuits shown in Fig. 4.

Thus, the device of this invention is a phase sensitive rectifier which produces a load current which is linearly proportional to the amplitude of the alternating current input voltage and which has a direction that depends upon the phase of the input voltage compared to a reference voltage of the same frequency.

The reference voltage can either be of sinusoidal or square-wave shape. When the reference voltage is of square-wave shape, the device of this invention can be used even though the input voltage is not 180° out of phase with the reference voltage. The reference voltage then at a predetermined time in each cycle, gates the conduction of current within the rectifier which is associated with the input voltage. The gating is accomplished by virtue of the predetermined time program of current flow within the biasing resistor which is common to both the rectifier in the input voltage circuit and the rectifier in the reference voltage circuit. Thus, the device of this invention is useful to control the conduction of current through a load resistor for any portion of the half cycle within which the rectifier of the input voltage circuit has its anode positive with respect to its cathode. For example, the conduction of current through rectifier 3 can be limited anywhere from zero to 180° when the cathodes are connected as shown, or anywhere between 180° and 360° when the connections to each of the rectifiers are reversed.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A phase sensitive rectifier comprising a first, second, third, and fourth rectifier circuit, said first and second rectifier circuits being coupled by a common coupling impedance, said third and fourth rectifier circuits being coupled by a common coupling impedance; a load resistor being connected in series in said first rectifier circuit, said load resistor being connected in series in said third rectifier circuit so that when current flows in said third rectifier circuit current flows through said load resistor in the opposite direction from the current which flows through said load resistor when current flows in said first rectifier circuit; a first and second voltage source; coupling means connected between said first voltage source and said first rectifier circuit; coupling means connected between said second voltage source and said second rectifier circuit; coupling means connected between said first voltage source and said third rectifier circuit; and coupling means connected between said second voltage source and said fourth rectifier circuit, said first, second, third, and fourth coupling means being connected so that when the voltage from said first coupling means is in phase with the voltage from said second coupling means, the voltage from said third coupling means is 180° out of phase with the voltage from said fourth coupling means, whereby the current flowing through said load resistor has an amplitude which is proportional to the amplitude of the voltage of said first voltage source and has a direction which depends upon the phase relation between the voltage of said first voltage source and the voltage of said second voltage source.

2. A phase sensitive rectifier circuit comprising a first, second, third, and fourth rectifier circuit; a first and second impedance element, said first impedance element being common to said first and second rectifier circuits, said second impedance element being common to said third and fourth rectifier circuits; and a load impedance common to said first and third rectifier circuits connected so that when current flows in said first rectifier circuit it flows through said load impedance in one direction and when current flows in said third rectifier circuit it flows through said load impedance in the other direction, whereby when current flows in said first rectifier circuit said current flows through said first impedance element biasing the rectifier in said second rectifier circuit to prevent current flow therein and when current flows in said third rectifier circuit said current flows through said second impedance element biasing the rectifier in said fourth rectifier circuit to prevent current flow therein.

3. A phase sensitive rectifier circuit comprising a signal voltage source; a reference voltage source; a first, second, third, and fourth rectifier circuit; a load impedance, said load impedance being connected into said first and third rectifier circuits so that when current flows in said first rectifier circuit it flows in one direction through said load impedance and when current flows in said third rectifier circuit it flows in the other direction through said load impedance; first, second, third, and fourth coupling means, said signal voltage source being connected into said first rectifier circuit by said first coupling means and into said third rectifier circuit by said third coupling means, said reference voltage source being connected into said second rectifier circuit by said second coupling means and into said fourth rectifier circuit by said fourth coupling means, said first, second, third, and fourth coupling means being connected to said first, second, third, and fourth rectifier circuits so that when said voltage applied to said first rectifier circuit is in phase with the voltage applied to said second rectifier circuit the voltage applied to said third rectifier circuit is opposite in phase to the voltage applied to said fourth rectifier circuit; and a first and second coupling impedance, said first coupling impedance being common to said first and second rectifier circuits, said second coupling impedance being common to said third and fourth rectifier circuits so that when current flows in said second rectifier circuit current does not flow in said first rectifier circuit and when current flows in said fourth rectifier circuit current does not flow in said third rectifier circuit whereby full phase demodulation is achieved.

4. A device as recited in claim 3 and further comprising a condenser in parallel with said load impedance; a parallel combination of a resistor and capacitor in series with said first rectifier circuit; a resistor and capacitor parallel combination in series with said third rectifier circuit; a series combination of a rectifier and a resistor in shunt with the rectifier of said third rectifier circuit and said load impedance; and a series combination of a resistor and rectifier connected in shunt with the rectifier of said third rectifier circuit and said load impedance whereby the linearity of the current through said load impedance is improved and said first rectifier circuit is completely decoupled from said third rectifier circuit.

5. A phase sensitive rectifier circuit comprising a signal voltage source; a reference voltage source; a first, second, third, and fourth rectifier; a first and second coupling impedance; a load resistor and condenser in parallel; a first, second, third, and fourth coupling means, said reference voltage source being connected by said second coupling means to said second rectifier and said first coupling impedance in series, said reference voltage source being connected by said fourth coupling means to said fourth rectifier and said second coupling impedance in series; a first and second parallel combination of a resistor and condenser; and a first and second series combination of a rectifier and resistor, said signal voltage source being connected by said first coupling means to said first rectifier, said first coupling impedance, said load impedance, and said first parallel combination in series, said first coupling means also being connected to said first series combination and said first parallel combination in series, said signal voltage source being connected by said third coupling means to said third rectifier, said second coupling impedance, said load impedance, and second parallel combination in series, said third coupling means also being connected to said second series combination and said second parallel combination in series whereby full phase demodulation is achieved.

References Cited in the file of this patent

UNITED STATES PATENTS

| Number | Name | Date |
|---|---|---|
| 2,148,718 | Agins | Feb. 28, 1939 |
| 2,270,697 | Clark | Jan. 20, 1942 |
| 2,414,102 | Hull et al. | Jan. 14, 1947 |
| 2,454,807 | Kennedy | Nov. 30, 1948 |
| 2,571,708 | Graves | Oct. 16, 1951 |